United States Patent [19]

Sapru et al.

[11] Patent Number: 4,623,597
[45] Date of Patent: *Nov. 18, 1986

[54] RECHARGEABLE BATTERY AND ELECTRODE USED THEREIN

[75] Inventors: Krishna Sapru, Troy; Benjamin Reichman; Arie Reger, both of Birmingham; Stanford R. Ovshinsky, Bloomfield Hills, all of Mich.

[73] Assignee: Energy Conversion Devices, Inc., Troy, Mich.

[*] Notice: The portion of the term of this patent subsequent to Dec. 11, 2000 has been disclaimed.

[21] Appl. No.: 801,545

[22] Filed: Nov. 25, 1985

Related U.S. Application Data

[63] Continuation of Ser. No. 614,273, May 25, 1984, abandoned, which is a continuation of Ser. No. 372,693, Apr. 28, 1982, abandoned.

[51] Int. Cl.$^4$ ..................... H01M 4/02; H01M 10/36
[52] U.S. Cl. ................................. 429/101; 429/209; 429/218; 429/223; 420/900
[58] Field of Search ................. 429/209, 218, 101, 57, 429/40, 223; 420/900

[56] References Cited

U.S. PATENT DOCUMENTS

| | | | |
|---|---|---|---|
| 3,669,745 | 6/1972 | Beccu | 429/218 |
| 3,824,131 | 7/1974 | Beccu | 429/223 |
| 3,874,928 | 4/1981 | Will | 429/57 |
| 3,980,501 | 9/1976 | Feder et al. | 429/218 |
| 4,107,405 | 8/1978 | Buegen et al. | 429/218 |
| 4,216,274 | 8/1980 | Bruning et al. | 429/101 |
| 4,430,391 | 2/1984 | Ovshinsky et al. | 429/40 |
| 4,431,561 | 2/1984 | Ovshinsky et al. | 420/900 |
| 4,487,818 | 12/1984 | Ovshinsky et al. | 429/44 |

*Primary Examiner*—Donald L. Walton
*Attorney, Agent, or Firm*—James D. Ryndak; Lawrence G. Norris; Richard M. Goldman

[57] ABSTRACT

An improved battery utilizing a hydrogen rechargeable anode of a disordered non-equilibrium multicomponent material including one or more elements forming a host matrix and at least one modifier element incorporated therein. The anode is capable of electrochemically absorbing hydrogen from an electrolyte during application of a charging current thereto. The hydrogen is stored in the anode bulk until discharge is initiated, whereupon an electrical current is produced when the hydrogen is released. The superior battery of the invention has attained high density energy storage, efficient reversibility, high electrical efficiency, bulk hydrogen storage without structural change or poisoning and hence long cycle life and deep discharge capability.

32 Claims, 6 Drawing Figures

RECHARGEABLE BATTERY AND ELECTRODE USED THEREIN

RELATED APPLICATIONS

This is a continuation of application Ser. No. 614,273 filed May 25, 1984, now abandoned, which is a continuation of application Ser. No. 372,693 filed Apr. 28, 1982, entitled "Improved Rechargeable Battery and Electrode Used Therein," now abandoned.

BACKGROUND OF THE INVENTION

The subject matter of this invention relates to the field of energy storage and utilization and in particular to an improved battery and to a rechargeable electrode for use therein. More particularly, the invention relates to a battery having an anode formed from a primarily non-equilibrium disordered material designed to have a large number of catalytically active sites and also a large number of storage sites to store a substantial amount of hydrogen with the chemical bonding designed to efficiently store and release the hydrogen. The battery anode is charged to store hydrogen and discharged to release the stored hydrogen to produce an electrical current.

The present invention frees the anode material design from the limits of crystalline stoichiometry and compositions and allows a whole range of reversible hydrogen storage bonding in the material. The superior battery of the invention has attained a high density energy storage, efficient reversibility, high electrical efficiency, bulk hydrogen storage without substantial structural change or poisoning and hence long cycle life and deep discharge capability. The disordered material preferably is formed from lightweight materials to give a high storage capacity and is made from low cost materials. Thus, for the first time a quantum step forward in battery performance has been attained.

The storage of energy has been one of the great scientific, technological and economic problems in the energy field and most particularly the storage of electrical energy.

The demand for the storage of electricity is increasing at a rapid rate as the world becomes increasingly more dependent on electricity generated from both large base load plants and from renewable, but variable energy sources. It has been estimated that the total energy storage required in the United States by the year 2000 will be about 200 trillion Wh (watt-hours). Batteries have particular advantages for storage applications since:

(1) they store and release electric energy,
(2) they are portable and modular and hence have very flexible uses,
(3) they are relatively easy to manufacture,
(4) they are relatively compact,
(5) they are compatible with and have the ability to follow efficiently the instantaneous variations in the demand for electricity, while at the same time providing regulation of the output, and
(6) they provide local storage and hence reduce transmission and distribution costs.

While each of the above advantages of batteries potentially are available, there remain many problems with conventional batteries. For example, conventional batteries containing lead, mercury or cadmium are environmental contaminants, and therefore cannot easily be disposed of. Conventional batteries have serious materials problems which effect shelf life and cycle life and make them uneconomical for many applications.

The battery field has long been recognized as being a field of slow development rather than the quantum leap forward necessary to permit cost effective use of batteries on a truly large scale basis. It has been stated that "Battery technology is a classic example of an evolving process. We take one step back for every two forward. Most systems that are receiving attention today have been around for decades, and you really can't point to any breakthroughs." A battery, both primary and secondary, with high energy and power density, low cost and long life with many rechargeable cycles is necessary to answer the needs for energy storage and portability which are basic requirements for energy storage. Because of the failure to achieve breakthroughs to solve critical problems in existing battery technology, batteries have achieved only a small fraction of their true potential use.

The applications and potential applications for batteries are too numerous and familiar to enumerate, but some applications are of particular interest for secondary batteries. A secondary battery is a battery which is capable of being recharged after use so that it can be used again to supply electrical energy. Secondary batteries have particular utility in portable applications, such as portable electronic devices, and are particularly suitable for the utilization of solar energy and other electricity generators, such as thermoelectric generators, especially for remote use. It is estimated that the size of the battery market for solar energy applications and the market for electric vehicle batteries will be in the hundreds of gigawatt hours by the year 2000. While great progress has been made in the photovoltaic conversion of solar energy into electricity, there has been little progress in the companion or supporting technology for storage of electrical energy. The development of a truly cost effective technology for storing electrical energy in a convenient reversible form would expand enormously the potential for the utilization of photovoltaic power generation.

The use of electric vehicles to replace fossil fuels is very important. It has been estimated that more than twothirds of all our energy, for example, from automobile exhausts or power plants, is wasted and given off to the environment. The Canadian House of Commons' Special Committee on Alternative Energy and Oil Substitution has stated: "The main problem with developing a practical and competitive electrical vehicle has been the inability to produce inexpensive, reliable, lightweight, energy-dense and durable batteries. A large variety of battery systems is presently being tested but none has emerged which completely overcomes all of these difficulties. Analysts continue to say a quantum leap in battery technology must be made before electrical vehicles become competitive with conventional cars in the automobile market."

The Department of Energy (DOE) has developed target goals for electric vehicles. The 1982 goal is to obtain a battery capacity of 56 Wh/kg which would power an electric vehicle for 100 miles. The best commercially attainable capacities are for lead acid and nickel cadmium batteries which are reported as 37 Wh/kg and 39 Wh/kg, which are well below the 1982 DOE goal. These two types of batteries account for about ninety percent of the secondary battery market. While it has been estimated that a 100 mile range would take care of about ninety percent of the driving needs of the urban population, a recent survey made for DOE shows that consumers are not likely to purchase electric vehicles in large quantities until their range is extended to 200 miles. This figure is beyond the range of existing batteries, but is within the capability of the battery of the present invention. For example, the battery of the present invention can be greatly reduced in size and weight while still producing the desired power, because of the high energy storage density. This greatly increased density gives rise to new battery applications which previously were prohibited, because sufficient power was not available for a given battery size and weight.

The components of a conventional secondary battery such as a nickel-cadmium cell are the anode formed from a cadmium material, and the cathode formed from a nickel hydroxide material. The anode and cathode typically are spaced apart in the cell containing an alkaline electrolyte, such as KOH. The battery is charged upon application of an electric current to the anode as shown in the following equation:

$$Cd(OH)_2 + 2e^- \rightarrow Cd + 2OH^-$$

When the battery is utilized (discharged) the reverse reaction occurs to provide a supply of electrons:

$$Cd + 2OH^- \rightarrow Cd(OH)_2 + 2e^-$$

Over the years, many different electrochemical systems have been developed for battery applications. Such systems, such as zinc-chloride, nickel-zinc, lithium-metal sulfide and nickel-hydrogen have been explored, but have only found limited and specialized applications. The nickel-zinc system has a low cycle life and is expensive. The zinc-chloride battery operates with hazardous chemicals and has a very complex recharging system along with being expensive. Most lithium-metal sulfide systems operate at only very high temperatures of above 350° C. The nickel-hydrogen system is a high pressure, large and expensive system utilized for some specialized space applications.

Each of the available systems provides one or more significant impediments to widespread use, such as low energy density, high operating temperatures, hazardous and/or toxic chemicals, expensive materials or operating procedures. Lead and cadmium systems, for example, both present disposal problems and neither system meets even the 1982 DOE goals. Further, battery electrodes are notorious for their susceptibility to corrosion which limits life time and cycling life for secondary batteries. The large-scale utilization of batteries for storage of electricity has remained blocked because of the fundamental limitations in the technology.

Some research has been conducted involving hydrogen rechargeable secondary batteries. However, a basic understanding resulting in a viable approach to optimizing such batteries has not been forthcoming in the scientific or patent literature. One example of such efforts is U.S. Pat. No. 3,874,928. These research efforts have not resulted in any commercial utilization of this battery technology. As a matter of fact, the prior research results have suggested no significant improvement over the conventional nickel cadmium system and hence have resulted in the hydrogen storage battery techniques apparently being ignored or abandoned.

Secondary batteries using a hydrogen rechargeable electrode operate in a different manner than the lead acid and other prior systems. The battery utilizes an anode which is capable of reversibly electrochemically storing hydrogen and employs a cathode of nickel hydroxide material which is used in a conventional secondary battery. The anode and cathode are spaced apart in an alkaline electrolyte. Upon application of an electrical current to the anode, the anode material M is charged by the absorption of hydrogen:

$$M + H_2O + e^- \rightarrow M\text{---}H + OH^-$$

Upon discharge the stored hydrogen is released to provide an electric current:

$$M\text{---}H + OH^- \rightarrow M + H_2O + e^-$$

The reactions are reversible and this is also true of the reactions which take place at the cathode. As an example, the reactions at a conventional nickel hydroxide cathode as utilized in a hydrogen rechargeable secondary battery are as follows:
Charging: $Ni(OH)_2 + OH^- \rightarrow NiOOH + H_2O + e^-$
Discharging: $NiOOH + H_2O + e^- \rightarrow Ni(OH)_2 + OH^-$ The battery utilizing an electrochemically hydrogen rechargeable anode offers important potential advantages over conventional secondary batteries. Hydrogen rechargeable anodes should offer significantly higher specific charge capacities than lead anodes or cadmium anodes, however, prior anodes have not levied up to that potential because of the limitations of the materials utilized. Thus more electrical energy per unit weight should be possible with such batteries making them particularly suitable for battery powered vehicles and other mobile applications. Furthermore, lead acid batteries and nickel-cadmium type secondary batteries are relatively inefficient, because of their low storage capacity and cycle life.

The materials used for the hydrogen rechargeable anode of the battery are of utmost importance since the anode must efficiently perform a number of functions within useful operating parameters in order to have an efficient charge/discharge cycle. The material must be capable of efficiently storing hydrogen during charging with insignificant self discharge until a discharge operation is initiated. Since complete reversibility of the charge/discharge reactions is necessary a highly stable bonding of hydrogen to the storage sites of the anode is not desired. On the other hand, it is also undesirable if the bonds between the hydrogen atoms and the anode material are too unstable. If the bonds are too unstable during charging the dissociated hydrogen atoms may not be stored by the anode, but may recombine to form hydrogen gas such as in the electrolysis of water. This can result in, low efficiencies, loss of electrolyte and inefficient charging.

The materials for storing hydrogen which have been proposed in the prior art for use as a hydrogen chargeable anode for secondary batteries have generally been limited to materials which are primarily crystalline structures. In crystalline materials the catalytically active sites result from accidently occurring, surface irregularities which interrupt the periodicity of the crystalline lattice. A few examples of such surface irregularities are dislocation sites, crystal steps, surface impurities and foreign absorbates.

A major shortcoming with basing such anode materials on crystalline structures is that irregularities which result in active sites typically only occur in relatively few numbers on the surface of a crystalline material.

This results in a density of storage sites which is relatively low. Of equal importance is that the type of sites available are of an accidental nature and are not designed into the material as are those of the present invention. Thus, the efficiency of the material for the storage of hydrogen and the subsequent release to form water is substantially less than that which would be possible if a greater number and variety of sites were available.

All of the previous attempts to utilize hydrogen in secondary batteries have proven to be unsuccessful, because the crystalline materials have one or more limiting factors which prevent commercialization. The invention herein provides a new and improved battery having an electrode formed from disordered non-equilibrium material which does not suffer from the disadvantages and limitations of the prior art batteries containing crystalline electrode materials.

SUMMARY OF THE INVENTION

The limitations of the prior art, and in particular those which have blocked large scale utilization of hydrogen rechargeable batteries are overcome by greatly improving and expanding in a unique and fundamental way, both qualitatively and quantitatively, the characteristics of the hydrogen electrode by providing disordered materials which can be tailor-made to greatly increase the reversible hydrogen storage characteristics which are required for efficient and economical battery applications. The superior battery of the invention has attained high density energy storage, efficient reversibility, high electrical efficiency, bulk hydrogen storage without structural change or poisoning and hence long cycle life and deep discharge capability. These essential battery attributes are unique to the present invention.

The disordered electrode materials are formed from lightweight, low cost elements by any number of techniques, which assure formation of primarily non-equilibrium metastable phases resulting in the desired high energy and power densities and low cost. The resulting low cost high energy density disordered material allows the batteries to be utilized most advantageously as secondary batteries, but also as primary batteries.

The materials of the present invention have a greatly increased density of catalytically active sites and storage sites when compared to single phase crystalline materials and other prior art materials, which improves the electrochemical charging/discharging efficiencies and provides a greater electrical energy storage capacity. The materials are tailored to allow bulk storage of the dissociated hydrogen atoms at bonding strengths within the range of reversibility suitable for use in secondary battery applications. Tailoring of the local structural and chemical order of the materials of the present invention is of great importance to achieve the desired characteristics.

The improved characteristics of the anodes of the present invention are accomplished by manipulating the local chemical order and hence the local structural order by the incorporation of selected modifier elements into a host matrix to create a desired disordered material. The disordered material has the desired electronic configurations which result in a large number of active sites. The nature and number of storage sites can be designed independently from the catalytically active sites. The desired multicomponent disordered material can be amorphous, polycrystalline (but lacking long range compositional order), or microcrystalline in structure or an intimate mixture of any combination of those phases. The ability to have a large number of sites and to simultaneously control the type of the active sites is also unique to the anodes of the present invention.

The framework for the active battery materials of the present invention is a host matrix of one or more elements. The host elements are chosen in general to be hydride formers and can be lightweight elements. The host matrix element or elements are modified by incorporating selected modifier elements, which may or may not be hydride formers. The modifiers also can be lightweight elements and enhance the disorder of the material, thus creating a greater number and spectrum of catalytically active and hydrogen storage sites. Multiorbital modifiers, for example transition elements, provide a greatly increased number of storage sites due to various bonding configurations available, thus resulting in an increase in energy density. The technique of modification to provide a non-equilibrium material having a high degree of disorder provides unique bonding configurations, orbital overlap and hence a spectrum of bonding sites. Due to the different degrees of orbital overlap and the disordered structure, an insignificant amount of structural rearrangement occurs during charge/discharge cycles or rest periods therebetween resulting in long cycle and shelf life.

The hydrogen storage and other characteristics of the disordered materials of the present invention can be controllably altered depending on the selected host matrix and modifier elements and their relative percentages to allow the tailor-making of the anode materials. The anodes are resistant to degradation by poisoning due to the increased number of selectively designed storage and catalytically active sites which also contribute to long cycle life. Also, some of the sites designed into the material can bond with and deactivate poisonous species without effecting the active hydrogen sites. The materials thus formed have a very low self discharge and hence good shelf life.

The disordered materials can be utilized for anodes of various configurations and designs. The materials can be deposited by vacuum deposition, spraying techniques, melt spinning and other similar rapid quenching techniques or can be manufactured in powder form.

DETAILED DESCRIPTION

Figure 1:
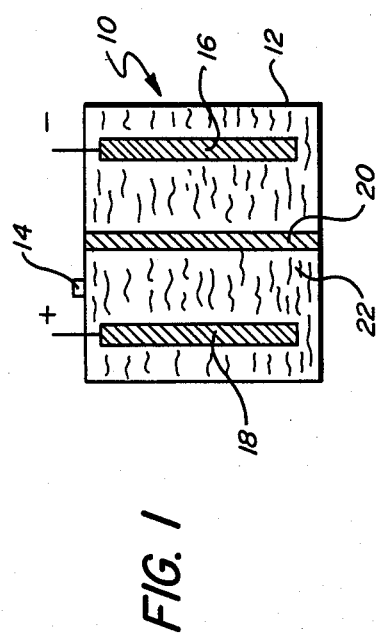
FIG. 1 is a schematic illustration of an embodiment of the battery of the present invention.

The battery of the present invention is a basic and unique approach to the electrical energy storage problem and has attained high density energy storage, efficient reversibility, high electrical efficiency, bulk hydrogen storage capacity without substantial structural change or poisoning and hence long cycle life and deep discharge capability. The improved battery includes disordered electrode materials having tailor-made local chemical environments which are designed to yield high electrochemical charging and discharging efficiency and high electrical charge output. The manipulation of the local chemical environments of the materials is made possible by utilization of a host matrix which can, in accordance with the present invention, be chemically modified with other elements to create a greatly increased density of catalytically active sites for hydrogen dissociation and also of hydrogen storage sites.

The disordered electrode materials, unlike the specific and rigid structure of crystalline materials, are ideally suited for manipulation since they are not constrained by the symmetry of single phase crystalline lattice or by stoichiometry. By moving away from materials having such restrictive single phase crystalline symmetry it is possible by selectively modifying in accordance with the present invention to accomplish a significant alteration of the local structural and chemical environments involved in electrochemical hydrogen storage to greatly enhance the properties of the anode materials.

The disordered materials of the present invention are designed to have unusual electronic configurations, which result from the varying 3-dimensional interactions of constituent atoms and their various orbitals. The disorder comes from compositional, positional and translational relationships of atoms that are not limited by crystalline symmetry in their freedom to interact. Selected elements can be utilized to further modify the disorder by their interaction with these orbitals so as to create the desired local chemical environments. These various configurations generate both a large number of catalytically active sites and hydrogen storage sites not only on the surface but throughout the bulk of the material. The internal topology that is generated by these configurations also allows for selective diffusion of atoms and ions. The invention that we described makes these materials ideal for the specified use since one can independently control the type and number of catalytically active and storage sites. All of the aforementioned properties make not only an important quantitative difference, but qualitatively change the materials so that, as shown by the results, unique new materials ensue.

The disorder in the modified material can be of an atomic nature in the form of compositional or configurational disorder provided throughout the bulk of the material or in numerous regions of the material. The disorder also can be introduced into the host matrix by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces which are rich in local chemical environments which provide numerous desirable sites for electrochemical hydrogen storage.

The disordered materials of the present invention all have less order than the highly ordered crystalline structures which provide the single phase materials such as used for many of the anodes of the prior art. The types of disordered structures which provide the local structural chemical environments for improved hydrogen storage characteristics in accordance with the present invention include multicomponent polycrystalline materials lacking long range compositional order, microcrystalline materials, amorphous materials having one or more phases or multiphase materials containing both amorphous and crystalline phases or mixtures thereof.

An advantage of employing these disordered materials is that with such materials storage sites can be distributed throughout the bulk of the material. Also, the disordered materials can be designed to have the desired porosity, which can further increase the storage capacity and charge/discharge rate. In a crystalline structure the storage sites are limited to a relatively few accidentally occurring irregularities appearing on the surfaces of the material. In a modified disordered material the locations of storage sites are not limited to just the surfaces of the material. In contrast to crystalline structures, the materials of the present invention have three dimensional disorder with storage sites distributed throughout the bulk of the material. They provide a substantially increased surface area which does not depend merely on the presence of cracks, voids and grain boundaries. The disordered materials of the present invention have a greatly increased density of storage and catalytically active sites which provide a significant improvement of hydrogen absorption and desorption in both amount of hydrogen stored and the efficiency of storage during charging. The catalytically active sites reduce the charging and discharging overvoltage and hence substantially the entire energy utilized during charging efficiently results in hydrogen stored in the bulk of the material. The density of storage sites is a major factor in enabling relatively high hydrogen storage capacity for electrochemical charging making these materials suitable for high energy density applications, such as for powering battery operated transportation vehicles.

Another advantage of the disordered materials of the present invention is that they are much more resistant to poisoning. As stated before, the materials of the present invention have a much greater density of catalytically active sites. Thus, a certain number of such sites can be sacrificed to the effects of poisonous species while the large number of unpoisoned active sites still remain to continue to provide the desired completely reversible hydrogen storage characteristics. Also, some of the poisons are inactivated by being bonded to other sites without effecting the hydrogen catalytic storage sites.

Another advantage of the host matrix of the present invention is that it can be modified in a substantially continuous range of varying percentages of modifier elements. This ability allows the host matrix to be manipulated by modifiers to tailor-make or engineer hydrogen storage materials with all the desirable characteristics, i.e., high charging/discharging efficiency, high degree of reversibility, high electrical efficiency, long cycle life, high density energy storage, no poisoning and minimal structural change. This is in contrast to multicomponent single phase crystalline materials which generally have a very limited range of stoichiometry available. A continuous range of control of chemical and structural modification to optimize performance characteristics of such crystalline materials therefore is not possible.

Referring now to FIG. 1, a schematic representation of a battery 10 of the present invention is illustrated. The battery 10 includes a casing 12 which can be hermetically sealed and/or can include a vent 14. The battery 10 includes an anode 16 formed from the disordered materials of the present invention and a cathode 18 which can be a conventional nickel hydroxide cathode. The anode 16 and cathode 18 are separated by a separator 20, which also can be a conventional separator such as utilized in the nickel cadmium systems. The battery 10 also contains an electrolyte 22 such as KOH. The dimensions and configurations of the battery 10 and electrodes 16 and 18 are dependent upon the application and can be of any shape, size, capacity, etc. as desired.

Figure 2:
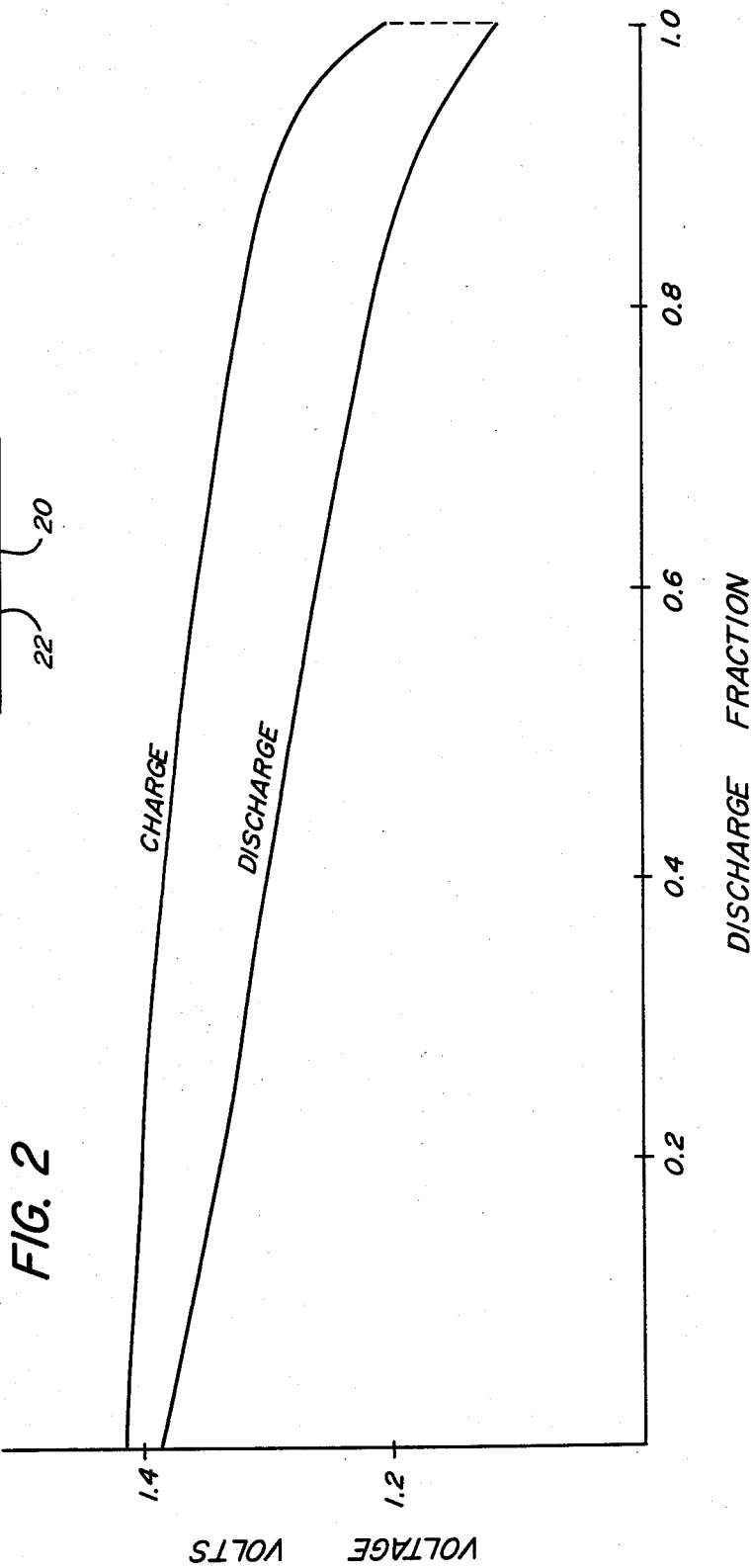
FIG. 2 shows a representative charge/discharge cycle of the battery.

A representative charge/discharge cycle of the battery 10 is illustrated in FIG. 2. The difference between the charge and discharge voltages at each depth of discharge shows a remarkably good charging efficiency. For example, at a 40% depth of discharge (0.4), the difference is only about 0.075 volts. It should be noted that the discharge cycle can be at any rate, depending upon the desired application and here was chosen to be 50 mA/gr. The charge rate is, however, chosen to maximize the efficiency of hydride formation and was chosen to be 25 mA/gr, which is a very high charging rate.

Figure 3:
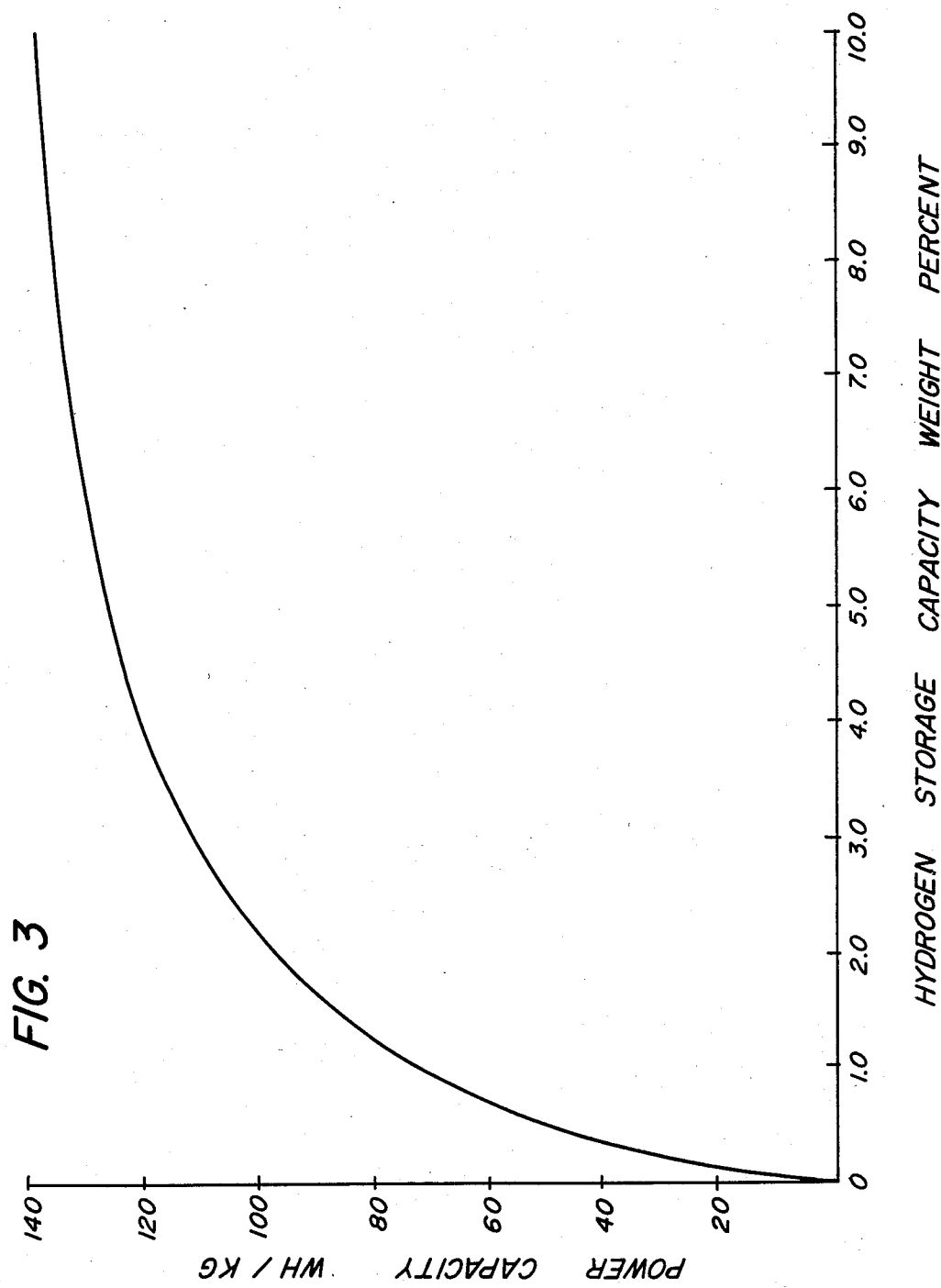
FIG. 3 shows a power vs. storage capacity curve of the battery.

FIG. 3 illustrates a calculated theoretical power capacity of the battery 10 vs. the storage capacity of the anode 16 when utilizing a conventional cathode 18. Since the efficiency of the nickel cathode does not change, it becomes the limiting factor in the battery 10. Nonetheless, only a three percent storage capacity anode 16 is capable of achieving a power capacity of 114 WH/kg. The materials of the present invention can be expected to exceed such a power capacity value which is sufficient to power a vehicle over 200 miles.

ANODE MATERIAL PREPARATION

A number of anodes 16 were prepared in accordance with the teachings of the present invention. The method selected for initial material screening was cosputtering. The cosputtering method is advantageous for material optimization since it is a relatively fast method of producing different kinds of modified materials to thereby allow a fast screening of the various materials to determine their characteristics. Sputtering also can be a desirable method for preparing the materials, because it lends itself to the production of the non-equilibrium disordered materials and allows an intimate mixing of the host matrix element and modifier elements on an atomic scale so that local order chemical modification can readily take place. Although sputtering techniques are described in detail, any of the allied rapid quenching, bulk and powder techniques which result in the desired non-equilibrium disordered materials are also applicable and within the scope of the invention.

The materials were prepared utilizing either a R.D. Mathis Sputtering Unit or a Sloan SL 1800 Magnetron Sputtering System. An advantage of the particular Sloan system over the Mathis unit, is that it can accommodate more then one target and thus each element sputtered can have a separate dedicated target. The Mathis unit is a single target unit and to accomplish sputtering of more than one element, the target was comprised of multiple elements. Thus, the Mathis target was comprised of a host element base with sections of desired modifier elements attached to the base.

One or more thin nickel substrates were positioned in the vacuum chamber of the sputtering machine employed. It is noted that other suitably conductive substrates such as titanium, graphite, mild steel, nickel plated mild steel or other materials can also be utilized. During deposition the substrates were maintained at a relatively cool temperature, 130° C. to 150° C., to ensure production of the desired disordered materials. The chamber was evacuated to a background pressure of typically approximately $1 \times 10^{-6}$ torr. Typically, argon gas was introduced into the chamber at a partial pressure of approximately $6.0 \times 10^{-3}$ torr. It is noted, however, that reactive sputtering in a gas containing hydrogen, for example 1% to 5% hydrogen, may be advantageous. The relative percentages of elements contained in the materials co-deposited on the substrate were controlled in a different manner depending upon the sputtering machine used. On the Sloan machine, the relative percentages were controlled by varying the magnitude of magnetic flux associated with each target and with the Mathis the composition of the materials was controlled by their position relative to the target.

A number of the materials were tested for utilization as the hydrogen rechargeable anodes 16 in batteries having various configurations, but substantially equivalent in operation to the battery 10. Further, anode tests were also performed in a half cell utilizing a 4M KOH electrolyte at room temperature, unless otherwise noted. The anodes were electrochemically charged with hydrogen by holding the electrode potential at approximately $-1.2$ volts vs. an Hg/HgO reference electrode for approximately 10 minutes. After charging the anode was disconnected and the cell open circuit voltage was measured. A constant discharge anodic current, such as 0.1 mA was caused to pass through the electrode and the anode's voltage vs. the reference electrode was recorded during the discharge period. When the electrode potential dropped to less than $-0.76$ volts the discharge cycle was terminated. The cutoff voltage of $-0.76$ was arbitrarily chosen, but it is noted that many applications for secondary batteries will have some similar lower voltage limit below which operation will cease thereby necessitating a recharging before further utilization of the battery.

Based upon these measurements the electrical storage capacity of each anode was calculated. Furthermore, since the discharge potentials were measured over a period of time the kinetics of the discharge were determinable. In addition to the electrical tests, other measurements were made. These included the hydrogen storage capacity by weight percent of the charged materials which were computed by dividing the weight of the hydrogen stored, by the sum of the weight of the material and the hydrogen stored therein, Also, the chemical compositions of the anode materials were determined by energy dispersive spectroscopy. All chemical composition are given in atomic percentages.

TABLE I

Performance of Various Anodes At Room Temperature

| Composition | Current Density mA/gr. | Specific Capacity mAh/gr. | % H Stored by Weight |
| --- | --- | --- | --- |
| $Ti_{80}Ni_{20}$ | 250 | 300 | 1.1 |

TABLE I-continued

Performance of Various Anodes At Room Temperature

| Composition | Current Density mA/gr. | Specific Capacity mAh/gr. | % H Stored by Weight |
|---|---|---|---|
| Ti$_{75}$Ni$_{25}$ | 250 | 188 | .69 |
| Ti$_{69}$Ni$_{31}$ | 167 | 154 | .58 |
| Ni$_{65}$Mg$_{35}$ | 88 | 143 | .52 |
| Ni$_{55}$Mg$_{45}$ | 50 | 199 | .73 |
| Mg$_{52}$Ni$_{48}$ | 94 | 161 | .60 |
| Ni$_{52}$Mg$_{48}$ | 50 | 566 | 2.1 |

Table I shows the test results of some representative examples of the anode materials of the present invention. One series of materials utilized a titanium host matrix modified by the incorporation of nickel. A typical open circuit voltage for these materials was found to be −0.93 volts vs. Hg/HgO. As can be seen, the materials with the highest Ti content provided the highest specific capacities and hydrogen storage percentages for this series. It is noted that none of the materials of the tested series approached the theoretical limit of two hydrogen atoms per Ti atom thereby showing that further increased storage capacity is possible in optimizing these materials, such as by the addition of low weight modifier elements as enumerated hereinafter. The specific capacity was taken by discharging to −0.76 volts as previously mentioned. Higher specific capacities can be generated just by discharging to a lower voltage.

Figure 4:
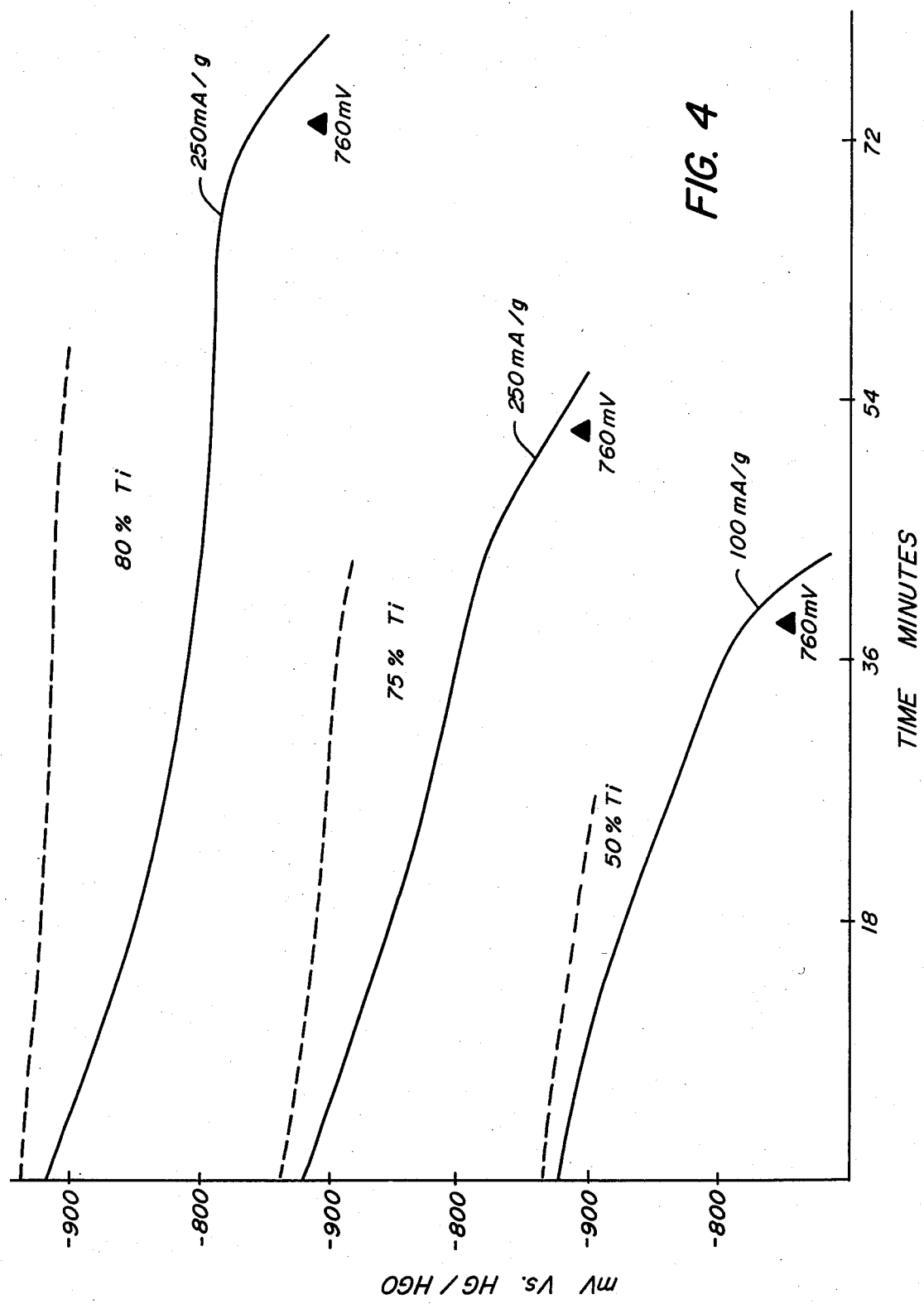
FIG. 4 shows several discharge potential vs. time curves with open circuit voltage curves for certain disordered Ti-Ni anode materials of the present invention.

Several discharge curves are shown in FIG. 4 for three TiNi materials of the present invention. Increased performance of the materials in terms of current density and discharge cycle length, are seen with increased Ti content. The unoptimized materials of the present invention provided long operating cycles at high current densities. The dashed lines represent the open circuit voltages at various depths of discharge and show very stable performance. Further and of great importance, the materials are shown to have excellent polarization characteristics which are substantially uniform. Each of the materials had a very small millivolt difference between the initial discharge voltage and the open circuit voltage. This very low overvoltage illustrates the very efficient operation of the anodes due to the high density of catalytically active sites.

Figure 5:
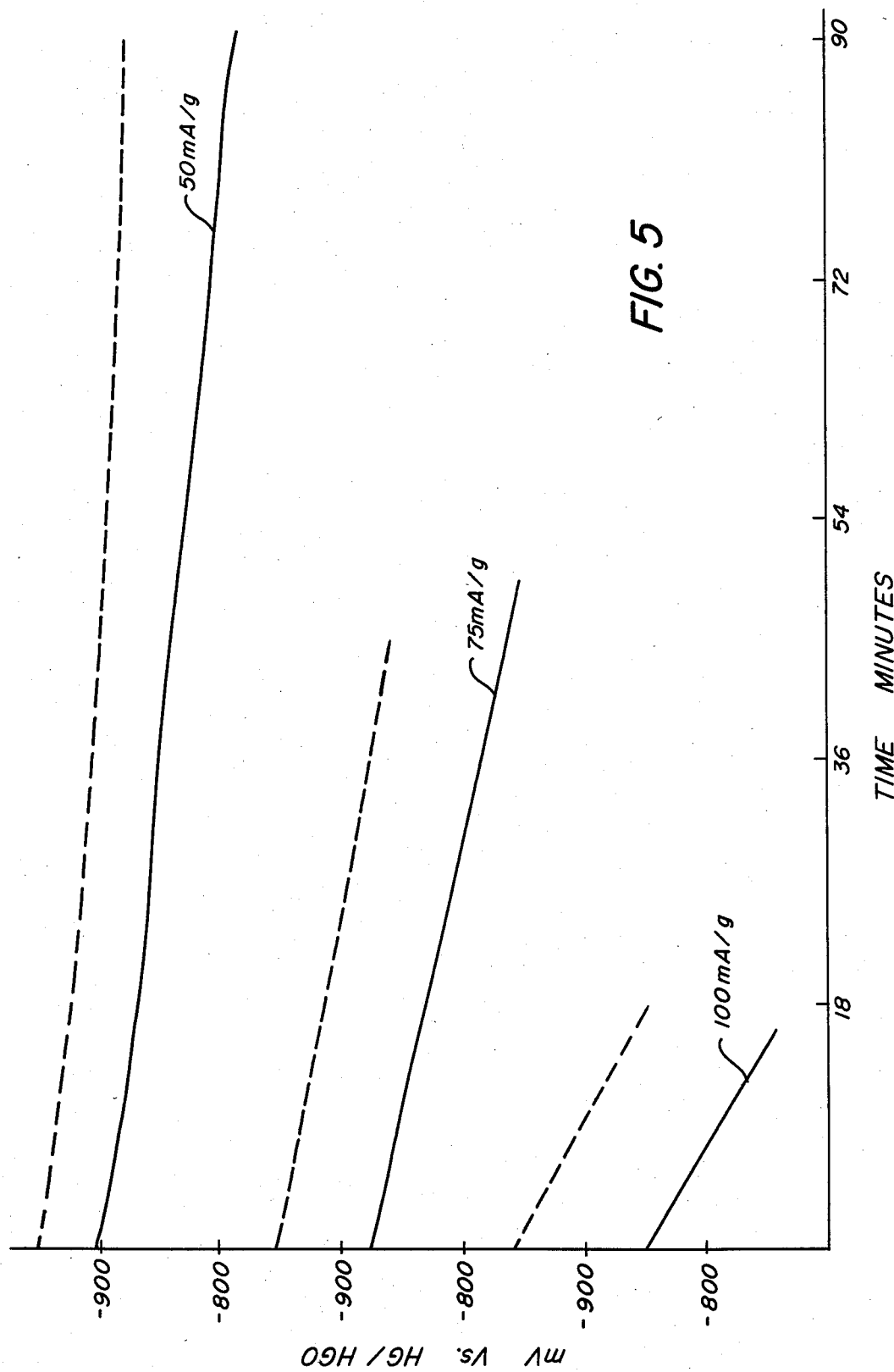
FIG. 5 shows several discharge potential vs. time curves with open circuit voltage curves for a prior art crystalline Ti-Ni anode material.

For reference, the TiNi system of FIG. 4 can be compared to the prior art at TiNi crystalline material illustrated in FIG. 5. The prior art anode at a 100 mA/gr current density operated at relatively low voltages which fell from about 840 mV to about 760 mV in less than 15 minutes. In comparison, the unoptimized Ti$_{80}$Ni$_{20}$ material of the present invention provided a current density two and one half times as large, operated at higher voltages which decreased more gradually, and provided a voltage of greater than 760 mV for about 80 minutes which is over five times as long as the prior art anode discharged at 100 mA/gr. A comparison of FIGS. 4 and 5 also shows the improved polarization of the materials of the present invention. The prior art materials show a much higher overvoltage at even a 50 mA/g discharge rate which increases dramatically as the discharge rate is increased to 100 mA/g. The catalytic inefficiency of the prior art materials is thus dramatically illustrated.

Figure 6:
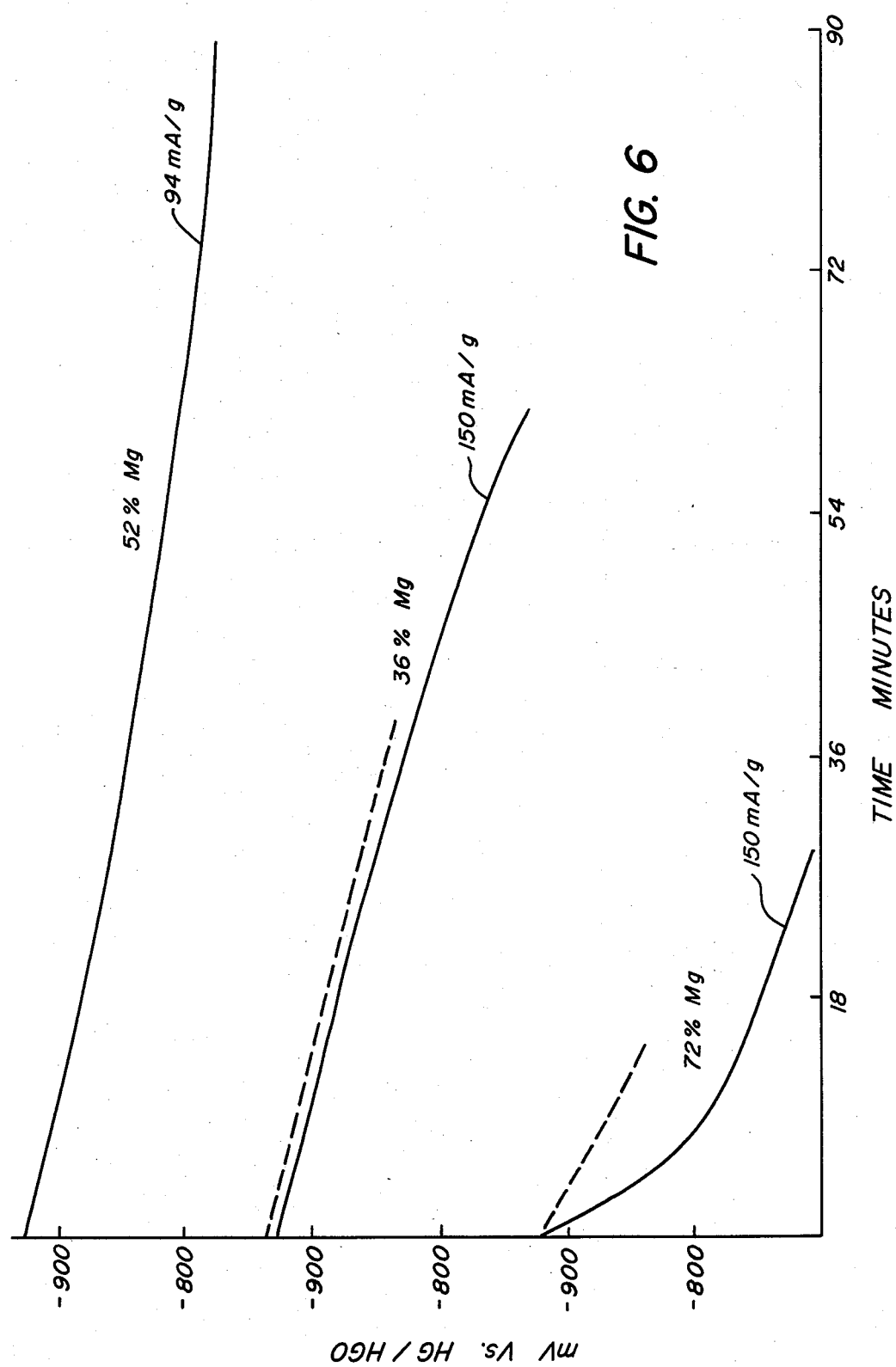
FIG. 6 shows several discharge potential vs. time curves with open circuit voltage curves for various MgNi materials of the present invention.

Table I also shows a series of NiMg materials formed with varying Mg content which also provided excellent results. The first three representative materials were prepared in the manner described above, however, the fourth material exhibited the best result. This material was prepared in a manner to result in a highly disordered substantially amorphous structure, which was achieved by depositing the material at a substrate temperature substantially below 50° C. This results in a substantial increase in the density of storage sites. The open circuit voltages of the NiMg materials were also quite good, approximately −0.93 volts vs. the Hg/HgO reference electrode. Discharge curves for certain of the NiMg disordered materials are shown in FIG. 6. These materials also have dramatically better polarization characteristics than the prior art materials. The 52% Mg curve was a continuous dischrage curve without open circuit voltage readings.

Other materials tested also showed suitability for use as an anode material for the hydrogen rechargeable battery. For example, a V host matrix modified with nickel provided an open circuit voltage of approximately −0.93 volts vs. Hg/HgO. Other host elements which may be particularly suitable for the anode materials of the invention include Zr, Nb, La, Si, Ca, Sc and Y. Each of the host element or elements preferably should be a hydride former and can also be lightweight elements. A "lightweight element" as used herein includes any of those elements which have an atomic number of 22 or less. Modifiers added to the host element or elements can include Cu, Mn, C, Fe, Ni, Al, Co, Mo, W, Li and Re. The modifiers also can be hydride formers.

Furthermore, while the representative materials tested are binary compositions the materials of the invention are not so limited and multi-element combinations of three or more elements can also be formed such as MgNiCu, TiNiCu, TiNiMg, MgFeAl, etc. The modifiers selected to increase the disorder of the host matrix elements, can be lightweight elements, and increase the number of catalytically active and storage sites and hence increase resistance to poisoning. This alloying results in more disorder, both positional and translational, neither of which is possible in a stoichiometrically bound or periodically constrained material. Excellent charging/discharging efficiencies were also found possible during testing of the materials of the present invention. For example, an anode material of approximately Mg$_{40}$Ni$_{60}$ composition was charged utilizing an applied voltage of 1.43 volts. The open circuit voltage resulting from the charging voltage of 1.43 was 1.4 volts, thus further evidencing the very high charging efficiency of the battery.

Certain of the materials of the present invention were tested at an elevated electrolyte temperature of 70° C. At the higher temperature the electrochemically induced storage capacity was increased and discharge performance was found to be improved. More importantly, operation at higher temperatures showed that the materials have a broad temperature operating range and are capable of much higher storage capacities and improved charge/discharge performance. For example, a Ti$_{75}$Ni$_{25}$ material having a specific capacity of 188 mAh/gr at 20° C., showed an increase to 475 mAh/gr at 70° C. Also, the Mg$_{52}$Ni$_{48}$ example was also tested at 50° C. and exhibited an increase in specific capacity to 240 mAh/gr. Thus by optimizing the materials using the modification technique, further improvements in battery performance can be attained. The battery 10 thus also has a wide temperature operating range in contrast to lithium systems which generally are high temperature systems and nickel-cadmium systems which generally operate below 50° C.

It should be noted that testing at 70° C. also gives an indication of very good shelf life of the anodes since operating at elevated temperatures would normally accelerate degradation of conventional battery electrodes. The highly disordered materials of the present invention, however, showed no signs of degradation after testing at 70° C. The 70° C. temperature was arbitrarily selected and is not an upper performance limit. The chemical stability of the disordered materials of the present invention is also excellent since the electrodes tested in the KOH electrolyte indicate no signs of degradation after numerous charge/discharge cycles. The resistance to degradation is attributed to the disordered structure of the materials as well as their ability to accommodate charge/discharge cycling without structural change. Some of the batteries were discharged substantially to zero potential, and were then recharged showing no permanent degradation and deep discharge potential.

It is also noted that the materials of the present invention are capable of absorbing hydrogen by subjecting the electrode to a gaseous hydrogen atmosphere at elevated temperatures. The gaseous hydrogen is catalytically dissociated and chemically bonded to the active storage sites. The charged/disordered anode material thus formed can then be discharged in a battery to provide a supply of electrons as discussed previously in detail. This method of charging the electrode can offer some operational advantages.

Although the anodes described ar formed from substantially homogeneous disordered material bodies, the anodes also can be formed in a multilayer structure. The anode structure can include a bulk formed from a disordered material having a large number of storage sites with a thin outer layer, such as 1 to 5 microns, of a second disordered material. The outer layer material is designed to have a substantial number of catalytically active sites to provide a low overvoltage during charge/discharge cycles.

Furthermore, due to the completely reversible nature of the battery, the hydrogen absorption and desorption characteristics remain substantially constant. The battery potential at any point in each desorption or discharge cycle is directly related to the state of charge of the battery, since the potential changes throughout the desorption cycle. Therefore, the amount of charge remaining in the battery is readily obtained.

While the present invention has been described in conjunction with specific embodiments, those of normal skill in the art will appreciate that modifications and variations can be made without departing from the scope of the present invention. Such modifications and variations are envisioned to be within the scope of the appended claims.

What is claimed and desired to be secured by Letters Patent of the United States is:

1. A hydrogen battery comprising:
   at least one anode for reversibly electrochemically charging and discharging hydrogen, said anode comprising a disordered multicomponent material, said disordered multicomponent material having at least one structure selected from the group consisting of: amorphous, microcrystalline, polycrystalline lacking long-range compositional order with three or more phases of said polycrystalline structure and any combination of said amorphous, microcrystalline and polycrystalline structures;
   a casing having said anode positioned therein;
   at least one cathode capable of reversible oxidation positioned within said casing and spaced from said anode;
   a separator separating the cathode and said anode; and
   an electrolyte in contact with both said cathode and said anode.

2. The battery of claim 1 wherein said anode material reversibly stores said hydrogen without degradation.

3. The battery of claim 1 wherein said anode material provides local chemical environments that include sites for selectively inactivating poisonous species.

4. The battery of claim 1 wherein said anode material is capable of inhibiting poisoning of the hydrogen absorption and desorption characteristics.

5. The battery of claim 1 wherein said anode material is capable of charging and discharging hydrogen at low overvoltages.

6. The battery of claim 1 wherein said anode material is capable of charging a large amount of hydrogen under one polarity and for discharging a desired amount of hydrogen under the opposite polarity.

7. The battery of claim 1 wherein said anode material is capable of reversibly deep discharging charged hydrogen.

8. The battery of claim 1 wherein said anode material includes at least one lightweight element.

9. The battery of claim 1 wherein said disordered material has an internal porosity to enhance the hydrogen absorption and desorption characteristics.

10. The battery of claim 1 wherein said disordered material has an internal topology to enhance the hydrogen absorption and desorption characteristics.

11. The battery of claim 1 wherein said anode material comprises at least one host matrix material selected from the group consisting of Mg, Ti, V, Zr, Nb, La, Si, Ca, Sc and Y.

12. The battery of claim 1 wherein said anode material includes at least one modifier element for said host matrix material selected from the group consisting of Cu, Mn, Fe, Ni, Al, Mo, W, Ti, Re or Co.

13. The battery of claim 1 wherein said anode material comprises a host matrix material and modifier element, said host matrix material selected from the group consisting of Mg, Ti, V, Zr, Nb, Si, Ca, Sc, Y, and combinations thereof and said modifier element is selected from the group consisting of Cu, Mn, C, Fe, Ni, Al, Co, Mo, W, Li, Re and combinations thereof.

14. The battery of claim 13 wherein said anode material is amorphous.

15. The battery of claim 1 wherein said anode material comprises a host matrix material and a modifier element, said host matrix material selected from the group consisting of Ti, Mg and V and said modifier element is Ni.

16. The battery of claim 15 wherein said anode material is amorphous.

17. The battery of claim 13 wherein said anode material comprises titanium and nickel.

18. The battery of claim 13 wherein said anode material has a composition in the range of from about $Ti_{69}Ni_{31}$ to about $Ti_{80}Ni_{20}$.

19. The battery of claim 18 wherein said anode material is amorphous.

20. The battery of claim 13 wherein said anode material has a composition of about $Ti_{80}Ni_{20}$.

21. The battery of claim 13 wherein said anode material has a composition in the range of from about $Mg_{52}Ni_{48}$ to about $Mg_{35}Ni_{65}$.

22. The battery of claim 13 wherein said anode material comprises vanadium and nickel.

23. A rechargeable hydrogen storage battery electrode comprising a disordered multicomponent material for reversibly, electrochemically charging and discharging hydrogen without forming hydrogen gas, said material including a host matrix selected from the group consisting of Mg, Ti, V, Zr, Nb, La, Si, Ca, Sc and Y, and combinations thereof and at least one modifier element selected from the group consisting of Cu, Mn, C, Fe, Ni, Co, W, Li, Re and combinations thereof, said material having at least one structure selected from the group consisting of amorphous, microcrystalline, polycrystalline lacking long-range compositional order with three or more phases of said polycrystalline structure and any combination of said amorphous, microcrystalline and polycrystalline structures.

24. The electrode of claim 23 wherein said material is amorphous.

25. The electrode of claim 23 wherein said host matrix material is selected from the group consisting of Ti, Mg, V and combinations thereof and said modifier is nickel.

26. The electrode of claim 25 wherein said electrode is amorphous.

27. The electrode of claim 23 wherein said host matrix is titanium and said modifier is nickel.

28. The electrode of claim 23 wherein said host matrix material is titanium and said modifier element is nickel, the composition of said electrode being in the range of from about $Ti_{69}Ni_{31}$ to about $Ti_{80}Ni_{20}$.

29. The electrode of claim 27 wherein said electrode is amorphous.

30. The electrode of claim 27 wherein said composition of said electrode is about $Ti_{80}Ni_{20}$.

31. The electrode of claim 23 wherein said host matrix is magnesium and said modifier is nickel.

32. The electrode of claim 23 wherein said host matrix is vanadium and said modifier is nickel.

* * * * *